March 8, 1927.
E. W. BUNGER
1,620,517
TIRE CHAIN
Filed March 24, 1924
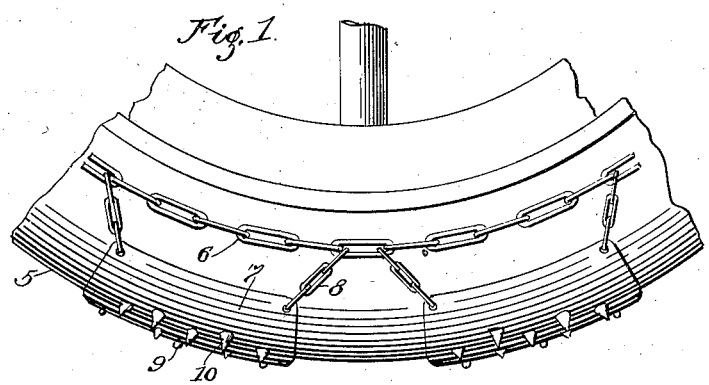
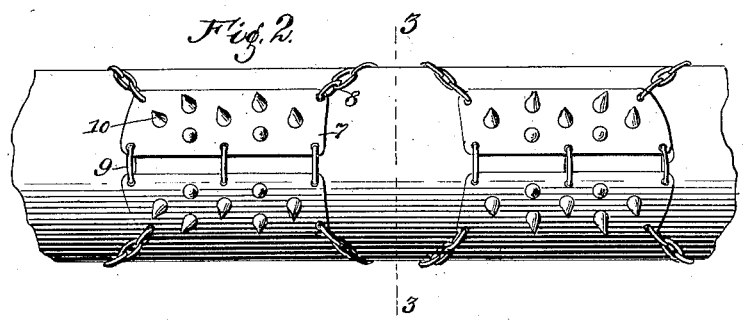
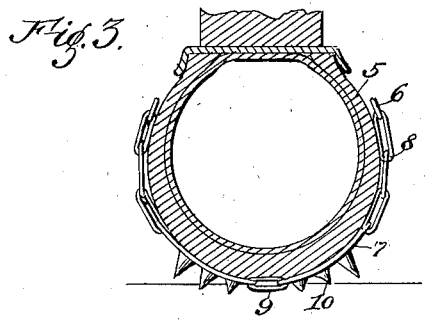
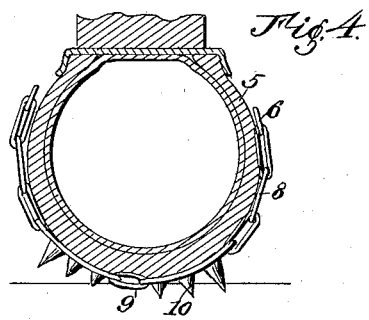
Inventor
Edward W. Bunger
By J. M. St. John
Attorney Patented Mar. 8, 1927.

1,620,517

UNITED STATES PATENT OFFICE.

EDWARD W. BUNGER, OF CEDAR RAPIDS, IOWA.

TIRE CHAIN.

Application filed March 24, 1924. Serial No. 701,420.

This invention relates to chains used to increase the traction of motor vehicle wheels; and the object of the invention is to improve such chains so as to increase the tractive efficiency thereof, especially against skidding.

The invention is fully disclosed in the description and claims following, reference being had to the accompanying drawing, in which:—

Fig. 1 is a side elevation of a chain embodying the invention as in use, enough of the chain being shown to fully illustrate the invention. Fig. 2 is a plan view of the same as seen from the under side of Fig. 1. Fig. 3 is a cross section of the same, on the line 3—3 of Fig. 2. Fig. 4 is a similar cross section showing the chain turned a little on the tire to illustrate the action of the chain when the wheel skids.

In the drawing, the numeral 5 denotes a pneumatic tire of a familiar type, to which the chain is applied. The chain as a whole comprises a pair of side or master chains 6, tread-plates 7, and connecting, diagonal chains 8. The plates are formed to the curvature of the tire, and are in pairs connected by cross-links 9, as shown. This gives them perfect flexibility, and adapts them to lie snugly against the tire, regardless of its diameter in section, within a certain limit of variation. Outwardly the tread portion of each plate is studded with spurs or calks 10 to give the plates a grip on the road, be it icy, muddy, or otherwise. Referring to Figs. 3 and 4 it will be seen that the spurs, beginning near the linked edges of the plates, are made progressively longer as they are disposed outwardly therefrom. The effect of this appears normally in Fig. 3, where all but the extreme outer rows of spurs are in contact with the road, represented by the horizontal line. This gives efficient tractive grip on a hard, slippery roadway, for direct propulsion. In mud, the long side spurs aid in the same manner. The greatest efficiency of the spurs, as above described, comes into play when the vehicle skids. This is always a more or less dangerous action, and against which the ordinary tire chain affords little protection. Fig. 4 represents a tire skidding toward the right. The instant effect on this chain is to wring it from its normal position and under the tread of the tire. This brings the longer spurs into powerful gripping contact with the road, and promptly checks the skidding motion of the car. When the vehicle resumes its straight forward course, the tire naturally returns to its normal position.

Having thus described my invention, I claim:—

A tire-chain, comprising a pair of side-chains, pairs of circumferentially disposed tread-plates closely linked together crosswise of the tire, and provided with traction spurs progressively increasing in length outwardly from the linked sides with points disposed out of a straight line across the tread, and diagonal chains connecting said plates with the side-chains.

In testimony whereof I affix my signature.

EDWARD W. BUNGER.